United States Patent
Kinder et al.

(10) Patent No.: US 8,721,153 B2
(45) Date of Patent: May 13, 2014

(54) BACKLIGHT REFLECTORS HAVING A PRISMATIC STRUCTURE

(75) Inventors: Brian A. Kinder, Woodbury, MN (US); Gary T. Boyd, Woodbury, MN (US); Stephen K. Eckhardt, White Bear Lake, MN (US); Chun-Yi Ting, Tayuan Hsien (TW); Han-Lin Tung, Hsin-Dian (TW); Linda M. Rivard, Stillwater, MN (US); Tao Liu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 448 days.

(21) Appl. No.: 12/808,587

(22) PCT Filed: Dec. 3, 2008

(86) PCT No.: PCT/US2008/085346
§ 371 (c)(1), (2), (4) Date: Oct. 14, 2010

(87) PCT Pub. No.: WO2009/085543
PCT Pub. Date: Jul. 9, 2009

(65) Prior Publication Data
US 2011/0032727 A1 Feb. 10, 2011

Related U.S. Application Data

(60) Provisional application No. 61/015,238, filed on Dec. 20, 2007.

(51) Int. Cl.
*F21V 7/04* (2006.01)

(52) U.S. Cl.
USPC .......... 362/626; 362/620; 362/97.1; 362/615; 349/65

(58) Field of Classification Search
USPC ............... 362/615–629, 97.1–97.2; 349/65
See application file for complete search history.

(56) References Cited

U.S. PATENT DOCUMENTS

| | | | |
|---|---|---|---|
| 4,576,850 A | 3/1986 | Martens | |
| 4,615,579 A | 10/1986 | Whitehead | |
| 5,254,390 A | 10/1993 | Lu | |
| 5,528,720 A * | 6/1996 | Winston et al. | 385/146 |
| 5,575,549 A * | 11/1996 | Ishikawa et al. | 362/625 |
| 5,882,774 A | 3/1999 | Jonza | |
| 6,079,838 A * | 6/2000 | Parker et al. | 362/617 |

(Continued)

FOREIGN PATENT DOCUMENTS

| | | | |
|---|---|---|---|
| JP | 06-027327 | 2/1994 | |
| JP | WO2006/092944 | * 9/2006 | 362/626 |

(Continued)

OTHER PUBLICATIONS

International Search Report for PCT/US2008/085346, 3 pgs.
Written Opinion of the ISA for International Application No. PCT/US2008/085346, 3 pgs.

*Primary Examiner* — Robert May
(74) *Attorney, Agent, or Firm* — Robert S. Moshrefzadeh

(57) ABSTRACT

A back reflector for a lightguide in a turning film backlight includes a prism film layer in direct contact with a reflective layer. The lightguide includes a light guiding region having a refractive index that is substantially spatially uniform. The reflective layer may be specular or diffuse and may include a multilayer polymeric film.

17 Claims, 5 Drawing Sheets

(56) References Cited

U.S. PATENT DOCUMENTS

| | | |
|---|---|---|
| 6,080,467 A | 6/2000 | Weber |
| 6,368,699 B1 | 4/2002 | Gilbert |
| 6,464,366 B1 * | 10/2002 | Lin et al. ............... 362/616 |
| 6,502,947 B2 | 1/2003 | Matsumoto |
| 6,950,155 B2 * | 9/2005 | Umemoto ............... 349/61 |
| 7,246,933 B2 * | 7/2007 | Kunimochi ............... 362/620 |
| 7,252,427 B2 * | 8/2007 | Teng et al. ............... 362/626 |
| 7,278,771 B2 * | 10/2007 | Campbell ............... 362/606 |
| 8,192,067 B2 * | 6/2012 | Sato ............... 362/626 |
| 2004/0212757 A1 | 10/2004 | Lee |
| 2008/0285304 A1 * | 11/2008 | Rankin et al. ............... 362/602 |

FOREIGN PATENT DOCUMENTS

| | | |
|---|---|---|
| KR | 10-1994-0022146 | 10/1994 |
| KR | 10-2003-0055844 | 7/2003 |
| KR | 10-2006-0098141 | 9/2006 |

* cited by examiner

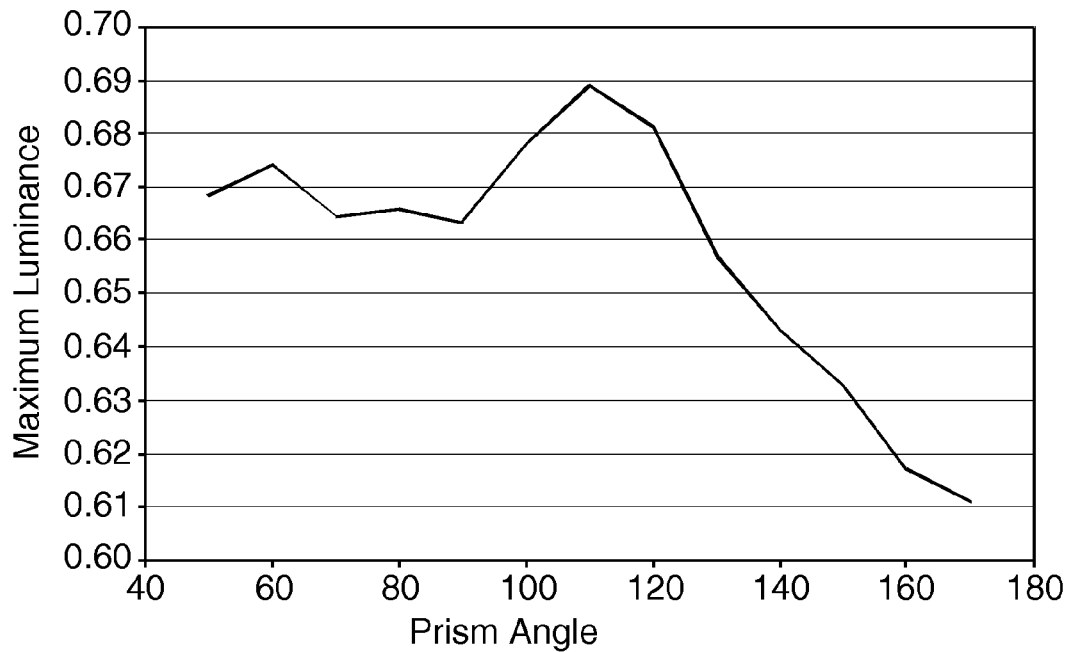
*Figure 9*
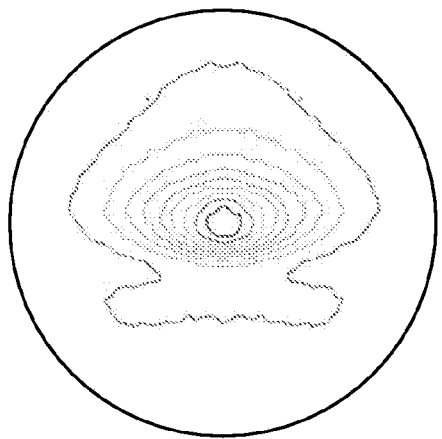 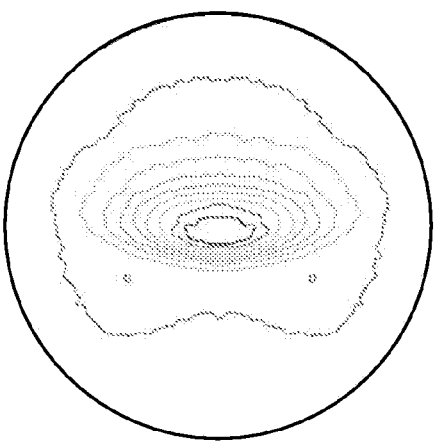
*Figure 10A*         *Figure 10B*

BACKLIGHT REFLECTORS HAVING A PRISMATIC STRUCTURE

CROSS REFERENCE TO RELATED APPLICATIONS

This application is a national stage filing under 35 U.S.C. 371 of PCT/US2008/085346, filed on Dec. 3, 2008, which claims priority to U.S. Provisional Application No. 61/015,238, filed on Dec. 20, 2007, the disclosure of which is incorporated by reference in its/their entirety herein.

FIELD OF THE INVENTION

The present disclosure is directed to backlights suitable for display devices, such as liquid crystal display devices.

BACKGROUND

Flat panel displays are used in a variety of applications ranging from relatively large devices including computer monitors and televisions, to small, low-power devices such as cell phones and wristwatches. Flat panel displays typically use liquid crystals, or other optically active materials, that require a backlight. For display applications, it is desirable that backlights generate bright, uniform illumination with few visible defects.

There is a need for enhanced backlights to provide lighting for optical displays, including displays used in low-cost or low-power applications. The present invention fulfills these and other needs, and offers other advantages over the prior art.

SUMMARY

Embodiments of the invention are directed to backlights that include a back reflector comprising a prism layer in contact with reflective layer. A turning film backlight includes a lightguide that has a light guiding region with an exit surface, a back surface, and at least one input edge. The light guiding region of the light source has a substantially spatially uniform refractive index. At least one light source is arranged to supply light to the input edge of the lightguide. A turning film having prism peaks oriented toward the lightguide is arranged to direct light emerging from the lightguide exit surface toward an illumination field. A back reflector is disposed along the back surface of the lightguide. The back reflector includes a reflective layer in contact with a prism layer having a series of substantially linear prisms. The back surface of the backlight may be substantially planar as the prism layer on the reflector reduces the need for lightguide prisms in turning film applications.

The reflective layer and the prism layer are in optical contact and/or are in direct physical contact substantially coextensively and/or may be physically joined together. For example, one or both of the reflective layer and the prism layer may comprise an adhesive sub-layer which joins the prism layer and the reflective layer. For example, the adhesive sub-layer may be a transparent adhesive, a pressure sensitive adhesive, a thermal adhesive and/or a radiation curable adhesive, such as an adhesive curable by ultraviolet (UV) light.

In some embodiments, the prism film of the reflector may have anti-wetout and/or anti-Moiré features. For example, the anti-wetout features can involve a variation in height of at least some of the prisms along a longitudinal axis of the reflector which extends parallel to peaks of the linear prisms. Alternatively or additionally, anti-wetout can be achieved by one group of the prisms having a nominally greater height than another group of the prisms. The anti-Moiré features may include variations in pitch of at least some of the prisms along the longitudinal axis. The prisms may be triangular prisms having curved or planar sides and an internal angle in a range of about 60° to about 170°. Peaks of the prisms may be flattened or rounded to increase robustness of the reflector.

The reflective layer may be specular or diffuse, or may include both specular and diffuse components. In some embodiments, the reflector may comprise a multilayer stack, such as a multilayer stack of birefringent first polymeric optical layers alternating with second polymeric optical layers.

The reflector is oriented with respect to the lightguide so that the reflector longitudinal axis, which extends parallel to the prism peaks of the reflector, is oriented substantially perpendicular to the input edge of the lightguide. In some embodiments, light extractors are arranged on the exit surface of the lightguide.

Another embodiment of the invention is directed to a method of making a turning film backlight. A back reflector is arranged along a back surface of a lightguide. The lightguide has a light guiding portion that has a substantially spatially uniform index of refraction. The back reflector includes a reflective layer in contact with a prism layer, the prism layer having rows of substantially linear prisms. The back reflector is oriented with respect to the lightguide so that prism peaks of the prism layer point toward the back surface of the lightguide and the longitudinal axis of the reflector is oriented substantially perpendicular to the lightguide's input edge. The process further includes arranging a turning film along an exit surface of the lightguide and orienting a light source to supply light into an input edge of the lightguide.

In some configurations, the reflective layer and the prism layer are joined prior to arranging the back reflector. For example, the reflective layer and the prism layer can be joined by coating a reflective material on the prism layer. Alternatively, the prism layer can by formed on the reflective layer.

For example, in some implementations, formation of the prism layer is achieved by depositing a transparent material on the reflective layer and embossing or microreplicating the linear prisms in the deposited material.

In some embodiments, the reflective layer and the prism layer are formed separately, and then the two layers are joined using an adhesive sub-layer. The adhesive sub-layer may be a sub-layer of the prism layer or a sub-layer of the reflective layer or both the prism and reflective layers may include adhesive sub-layers. The reflective layer and the prism layer may be joined by laminating the layers.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 9 is a plot useful for determining the prism angle for the reflector prisms in accordance with embodiments of the invention;

FIG. 10A shows the conoscopic plot for a backlight using a back reflector according to embodiments of the invention;

FIG. 10B shows a conoscopic plot for a backlight similar to that of FIG. 11A but using a conventional back reflector.

Figure 1:
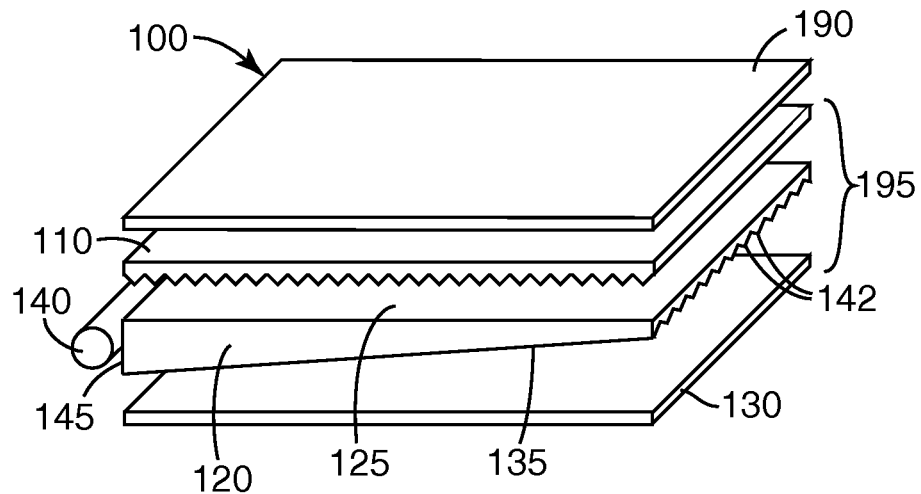
FIG. 1 illustrates components of a turning film backlight.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

FIG. 1 illustrates a system 100 incorporating an illumination field 190 such as a liquid crystal display (LCD) panel which is illuminated by a backlight 195. The major components of the backlight 195 are a light source 140, a wedge-type lightguide 120, a turning film 110, and a back reflector 130.

The turning film 110 is a type of light directing film that can enhance the brightness of the backlight 195. The turning film 110 operates by adjusting the angle of light emerging from an exit surface 125 of the lightguide 120, toward a preferred viewing angle. Light is supplied to an input edge 145 of the lightguide 120 by a light source 140, such as a light emitting diode (LED). In alternate configurations, multiple light sources may be used to supply light to a single input edge or to multiple input edges.

The lightguide 120 includes a number of prisms 140 on the back surface 135 of the lightguide 110. The prisms 140 may be formed by v-cuts made in the lightguide's back surface 135. The peaks 140 formed by the v-cuts run longitudinally along the lightguide 120, substantially perpendicular to the input edge 145. The prisms 140 serve to direct the light toward a preferred viewing angle, typically a viewing angle that is substantially perpendicular to the output surface 125 of the backlight 195. A back reflector 130 arranged along a back surface 135 of the lightguide 120 reflects light that escapes from the lightguide's back surface 135 and redirects the escaping light toward the lightguide 120. In turning film backlight systems, a significant percentage of the light, e.g., 50% or more, may be reflected by the back reflector 130 before emerging from the backlight 195 toward the display panel 190.

The manufacturing processes and/or tooling necessary to produce v-cuts that form prisms on the back surface of a lightguide are relatively expensive. Furthermore, the v-cuts on the lightguide can negatively affect yield due to the fragility of the prisms which are subject to breakage during the manufacturing process or subsequent handling. The approaches described herein involve systems and methods that may be used to eliminate v-cuts on the lightguide, thus reducing lightguide manufacturing costs and producing a more robust lightguide structure that improves manufacturing yield.

Figure 2:
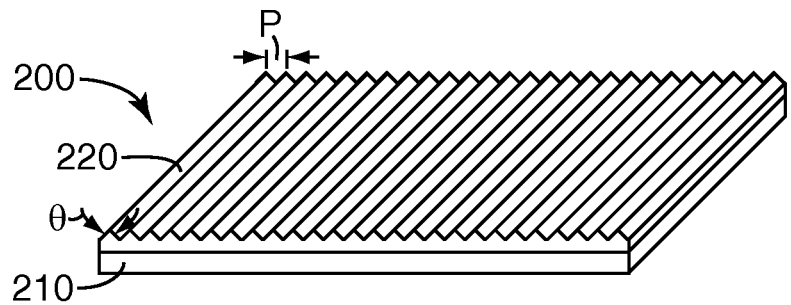
FIG. 2 is a view of a back reflector including a reflective layer and a prism layer in accordance with embodiments of invention.
Figure 3:
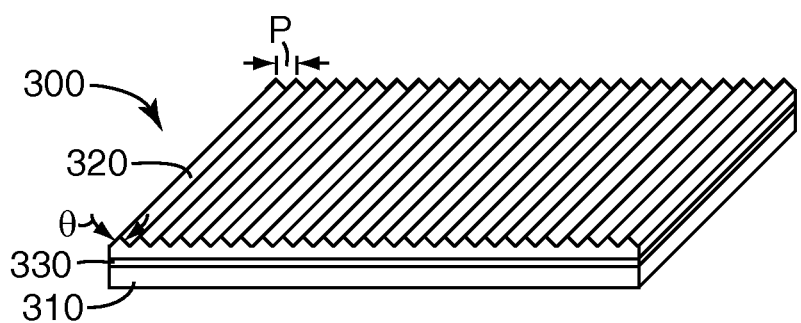
FIG. 3 a view of a back reflector including a reflective layer and a prism layer that are joined by an adhesive sub-layer in accordance with embodiments of invention.

Embodiments of the invention are directed to backlights incorporating a back reflector that includes a reflective layer in direct contact with a prism layer. FIGS. 2 and 3 illustrate back reflectors useful in display systems using a turning film backlight as illustrated in FIG. 1. As shown in FIG. 2, the back reflector 200 includes a reflective layer 210 and a prism layer 220. The reflective layer 210 may be specular or diffuse; the reflective properties of the reflective layer are discussed in more detail below. The prism and reflective layers may be separate layers that are arranged so that they are in direct contact substantially coextensively with each other, without an intervening air gap, and may optionally be attached to each other by any suitable means or method known to those skilled in the art.

In some embodiments, the reflective layer and the prism layer may be formed as separate structures that are subsequently bonded, laminated, adhered, or otherwise joined together. In some embodiments, the prism layer can be formed along with the reflective layer, for example, by co-extrusion.

The back reflector may be formed by coating a reflective material on the prism layer, such as by evaporating or sputtering a reflective material onto the prism layer. In further implementations, the reflective layer may serve as a substrate for formation of the prism layer. For example, the prism layer may be formed by depositing a transparent material on the reflective layer followed by an embossing process that imprints the prismatic structure in the deposited material. In some processes, the prisms are micro-replicated onto a reflective layer substrate. In some embodiments, the reflective layer may comprise a multilayer polymer film, such as enhanced specular reflector (ESR) available from 3M Company, St. Paul, Minn.

In configurations where the reflective layer and the prism layer are formed as separate structures and then joined together, the reflective layer and/or the prism layer may include a sub-layer of adhesive, e.g., a transparent adhesive, that is used to join the reflective and prism layers. One or both of the layers may be primed for improving adhesion. Exemplary priming techniques include chemical priming, corona surface treatment, flame surface treatment, flashlamp treatment and others. FIG. 3 illustrates a back reflector 300 having reflective and prism layers 310, 320 joined by an adhesive sub-layer 330. The adhesive sub-layer 330 may comprise an adhesive material that is curable by radiation (e.g., ultraviolet (UV) radiation) and/or activated by heat and/or pressure.

As illustrated in FIGS. 2 and 3, the prism layer 220, 320 includes rows of prisms that are transparent and substantially linear. Each prism has a polygonal cross section, such as a generally triangular cross section, that is longitudinally extended. The sides of the prisms can be curved or planar. The prism pitch, p, may be less than a millimeter and substantially larger than the wavelength of visible light to avoid diffraction effects. For example, the prism pitch may be in a range of about 5 μm to about 500 μm or in a range of about 15 μm to about 75 μm. The internal angle of the prisms, θ, may be in a range of about 70° to about 130° or in a range of about 100° to about 120°. The internal angle of the prisms may be selected based on the lightguide configuration and extraction feature geometry, as well as the refractive index of the materials used. The optimal internal prism angle for given lightguide characteristics can be determined by optical modeling. Selection of the internal prism angle for the prism layer is discussed further in connection with FIG. 10.

Embodiments of the invention advantageously reduce observable defects caused by optical phenomena that arise when optical structures overlap. Among the most common optical defects are wet-out, Newton's rings, and Moiré effects. Wet-out occurs when two surfaces optically contact each other, thus effectively removing the change in refractive index for light propagating from one film to the next. This is particularly problematic for films that use a structured surface for their optical effect, since the refractive properties of the structured surface are nullified. The effect of wet-out is to create a mottled and varying appearance to the screen. Newton's rings are the result of a slowly varying air gap between two films. The result of Newton's rings is a contour pattern on the screen which may be distracting to the viewer. Moiré effects are caused by optical interference patterns that can appear, for example, when two or more films having linear prisms are overlaid. Moiré may occur for a very wide range of pitch ratios. The defects described above give the display a non-uniform, mottled, or uneven look that is undesirable and may be distracting to the viewer.

Although the prisms of the reflector are generally linear, in some embodiments, the pitch and/or height of the prisms may be varied to reduce observable defects caused by wet-out and/or Moiré effects. In some configurations, the prism pitch and/or prism height is varied row by row or by groups of prism rows. In some configurations, the prism pitch and/or prism height is varied along the extent of individual prisms. For example, at least some of the prisms may vary in height along a longitudinal axis of the reflector which extends parallel to peaks of the linear prisms. Alternatively or additionally, at least some of the prisms may vary in pitch along the longitudinal axis.

Figure 4:
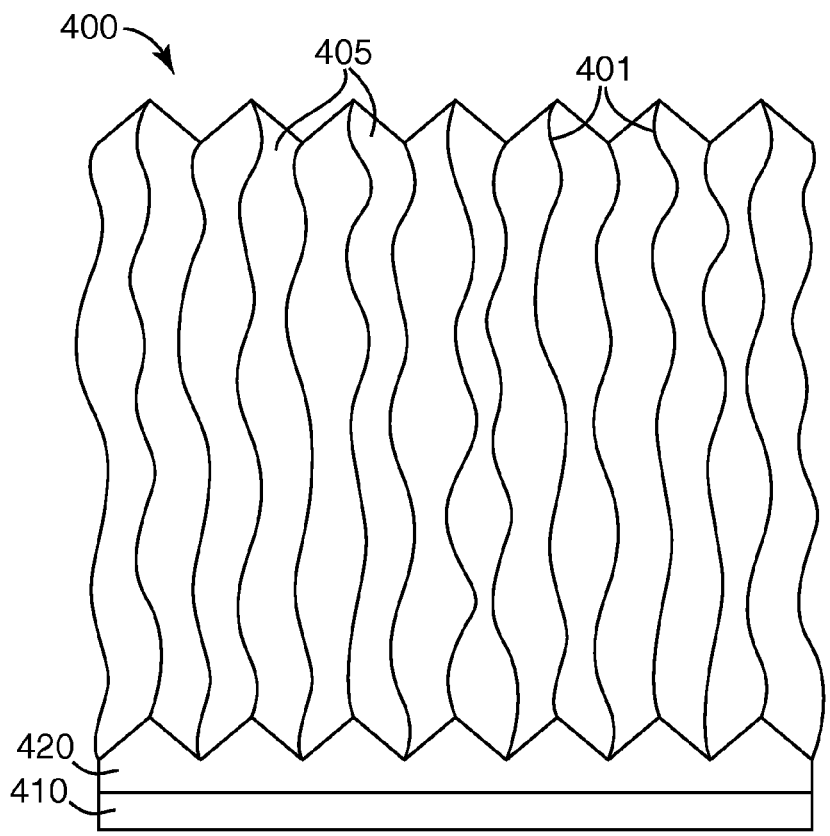
FIG. 4 illustrates a back reflector having a prism layer with varying prism pitch in accordance with embodiments of the invention.

FIG. 4 illustrates a reflector 400 having a reflective layer 410 and a prism layer 420 with prisms 405 that vary in pitch along the extent of the individual prisms 405. The variation in prism pitch causes the prism peaks 401 to form wavy lines. Varying the pitch of the prisms 405 reduces Moiré effects that arise from interactions between the prisms of the reflector with those of the light directing film. The variation in prism pitch may be random, pseudorandom, or non-random.

Figure 5:
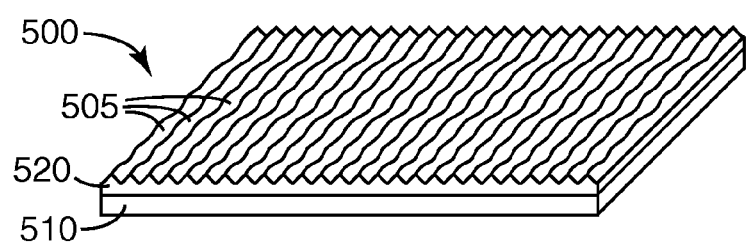
FIGS. 5 and 6 illustrate back reflectors having prisms of varying height in accordance with embodiments of the invention.
Figure 6:
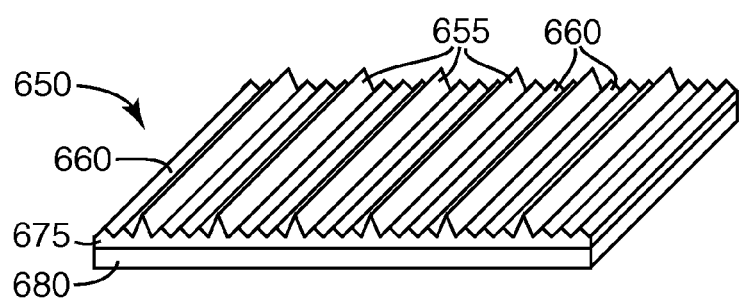

FIG. 5 illustrates a reflector 500 including a reflective layer 510 and a prism layer 520, where the peak height varies along the extent of the individual prisms 505. The variation in peak height reduces wet-out defects by optically decoupling the prism layer 520 of the reflector 500 from an adjacent optical layer. The variation in peak height may be random, pseudo-random or non-random. FIG. 6 illustrates a reflector 650 having a prism layer 675 and a reflective layer 680. The reflector 650 shown in FIG. 6 provides anti-wet-out functionality, where the peak height of each individual prism is substantially constant along the extent of the prism, but a first group of prisms 655 has a peak height that is greater than the peak height of another group of prisms 660. In some embodiments, variations in prism pitch and prism height may be implemented together in the prism layer, providing reflectors having both anti-wet-out and anti-Moiré functionality. For example, both the prism height and prism pitch may vary along the extent of individual prisms of a prism layer. As another example, a prism layer may include a first group of prisms that has a different height and/or a different pitch from a second group of prisms of the prism layer.

As previously discussed, the prism and reflective layers of the reflector are arranged in so that they are in direct physical contact substantially coextensively and/or the prism and reflective layers may have adjacent surfaces joined together. In some configurations the prism and reflective layers are formed as a single unit, such as by co-extrusion. One advantage of direct physical contact between the reflective and prism layers is the elimination or reduction in the possibility of Newton's rings which may occur when a small air gap (e.g. an air gap of less than a few wavelengths of light or about 10λ) is present between substantially smooth surfaces.

Figure 7A:
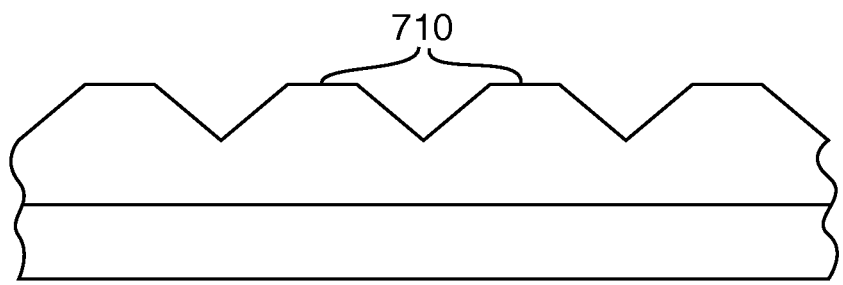
FIGS. 7A and 7B illustrate prism layers for backlight reflectors having flattened and rounded peaks, respectively, in accordance with embodiments of the invention.
Figure 7B:
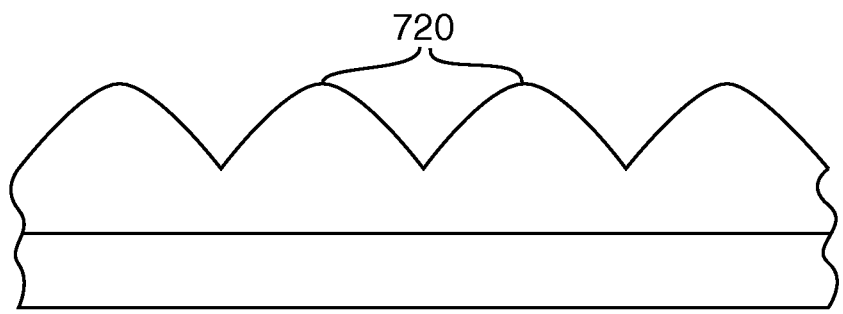

Prisms with acute tips may be fragile. Prism damage can be reduced by forming blunt prism tips, such as the flattened 710 or rounded 720 prism tips illustrated in FIGS. 7A and 7B, respectively. Provided the area of the flat or rounded radius is small with respect to the area of the prism, the use of blunt tips can provide a reasonable compromise between robustness and performance. For example, a radius of up to about 5 μm on prisms with a pitch of about 20 μm may provide acceptable performance and robustness. Similar sizes of flats may also be used, and the flats need not be parallel to the prism bases.

The prism layer may be made from a transparent, curable polymeric material. The refractive index of the prism layer may be in a range of about 1.48 to about 1.65. Exemplary suitable high refractive index resins that can be used to form the prism layer include radiation curable resins disclosed in U.S. Pat. Nos. 5,254,390 and 4,576,850.

Any type of reflector can be used as the reflective layer. In some embodiments, the reflective layer is a specular reflector, although the reflective layer can have a reflectivity that includes a specular reflectivity component, a diffuse reflectivity component or both specular and diffuse reflectivity components. Examples of suitable reflective layers include metallic reflective layers, such as silver-coated or aluminum coated mirrors or mirror films, polymeric reflective layers, such as multilayer polymeric reflective films, multilayer organic films, multilayer inorganic films, specular reflectors coated with diffuse coatings, particle-loaded polymeric films, particle-loaded voided polymeric films, and back-scattering reflectors. This list of illustrative reflective elements is not meant to be an exhaustive list.

The reflective layer may comprise a stack of multiple layers of reflective films that include index of refraction differences between at least two different materials, e.g., polymers, to specularly reflect light incident on the materials. The microlayers may be isotropic, i.e., having an index of refraction that is the same along x, y, and z directions, or may be birefringent, i.e., having indices of refraction along x, y, and z directions that are not all the same. A suitable multilayer reflector can be made, for example, by alternating or interleaving first optical layers with second optical layers. For films or layers in a film, a convenient choice of the x, y and z axes includes x and y axes along the length and width of the film, respectively, and the z axis normal to the surface of the film. One commercially available form of a multilayer reflector that includes biaxially-oriented birefringent layers is marketed as Enhanced Specular Reflector (ESR) by 3M Company, St. Paul, Minn.

The microlayers may be utilized to form a symmetric reflective layer, which reflects normally incident light of any polarization substantially equally, or to form an asymmetric reflective layer, which has a high reflectivity for normally incident light of one polarization and lower reflectivity for normally incident light of an orthogonal polarization. Additionally, the microlayers can be formed to alter the polarization of the reflected light from the incident light in a prescribed way.

Whether the second optical layers are isotropic or birefringent, the interface between the first and second optical layers forms a light reflection plane. In some embodiments, the refractive indices of the first and second optical layers are substantially matched along the z-direction. The reflectivity of such multilayer reflectors can be increased by increasing the number of layers or by increasing the differences in the indices of refraction between the first and second layers, or both. Additional details regarding multilayer reflective stacks are described, for example, in U.S. Pat. Nos. 5,882,774, 6,080,467, and 6,368,699.

Reflective stacks may include tens, hundreds, or thousands of first and second microlayers arranged in an interference stack. The material of the first and/or second layers can be inorganic (such as $TiO_2$, $SiO_2$, $CaF$, or other materials) or organic, e.g., polymeric (polyethylene naphthalate (PEN), polymethyl methacrylate (PMMA), polyethylene terephthalate (PET)), acrylic or other materials. A stack may have an all-inorganic, or mixed inorganic/organic construction.

A back reflector having prism and reflective layers in direct contact produces reflectivity characteristics that differ from the reflectivity characteristics of a back reflector that incorporates even a small air gap between the prism and reflective layers. A multilayer stack of birefringent optical films have high reflectivity and thus are particularly useful as the reflective layer of the backlight reflectors described herein. The reflectivity characteristics of these multilayer reflectors are dependent on the angle of incident light. Excellent reflectivity may be achieved, at a particular wavelength or over a wavelength range, for example, for incident angles that are moderately close to normal to the ESR surface. However, for glancing angles, the reflectivity of the multilayer ESR stack may be decreased for some or all wavelengths.

Embodiments of the invention are directed to the use of a back reflector as described herein in conjunction with lightguides having a substantially spatially uniform refractive index, being substantially free of scattering particles free of scattering particles in the volume such as those with refractive indices more or less than the host material of the lightguide. The back reflectors having prism and reflective layers as described herein are particularly useful in turning film backlight applications with spatially uniform refractive index lightguides. The angular distribution of light emerging from the back surface of the lightguide controls the angular input distribution of light to the back reflector. Light that emerges from the back surface of a spatially uniform index lightguide has a narrower angular output distribution when compared to the angular distribution of light emerging from the back surface of a light scattering guide. As discussed above, light entering the back reflector in a narrower range of angles is particularly advantageous when used in conjunction with a back reflector that includes a prism layer and an ESR layer in accordance with embodiments of the present invention.

As previously discussed, turning film backlights typically use wedge lightguides with longitudinal v-cuts (prisms) running down the lightguide. The longitudinal prisms on the lightguide tend to increase the overall fragility of the lightguide and increase the expense of lightguide manufacturing due to the processing steps required to form the lightguide prisms. In addition, the presence of the v-cuts is problematic with regard to placement of extractors on the back surface of the lightguide.

The prisms on the reflector concentrate light toward the preferred viewing direction of the backlight, eliminating or reducing the need for lightguide prisms. The back reflectors having a prism layer and a reflective layer as described herein can provide a smaller angular output range of light emerging from the backlight when compared to a backlight having a reflector without the prism layer. Additionally, the back reflectors illustrated in the embodiments of the present application advantageously allow fabrication of turning film backlights without a v-cut lightguide. As previously discussed, making v-cuts in the lightguide to form the lightguide prisms requires special tooling which increases manufacturing costs and reduces yield. A back reflector as described herein allows a simpler, less expensive lightguide, similar to the type used in recycling film backlights, to be implemented in turning film applications. When used in conjunction with a back reflector exemplified in the embodiments described above, a lightguide for a turning film backlight may be constructed with generally planar exit and back surfaces. This simplified, planar structure increases manufacturability and durability for lightguides used in turning film applications, in addition to providing other desirable characteristics. Furthermore, the use of a back reflector allows the use of a lightguide with a planar back surface, facilitating the placement of extractors on the back surface of the lightguide which is desirable in some implementations.

Figure 8:
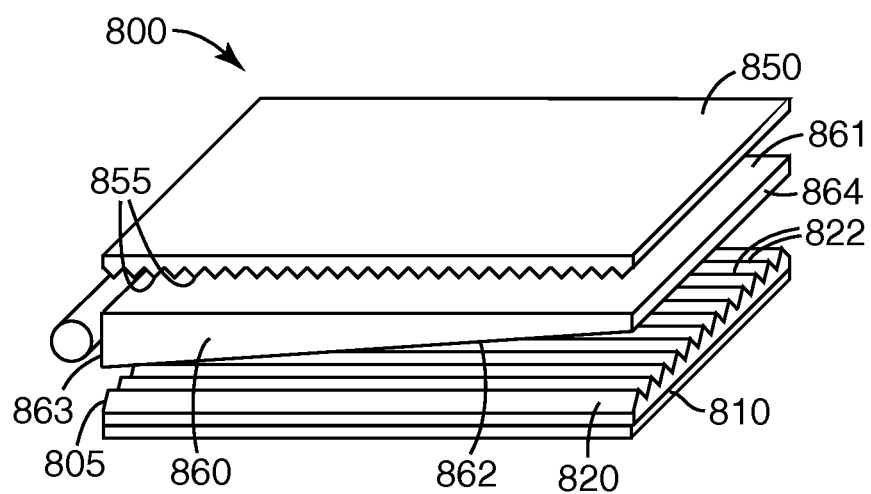
FIG. 8 shows the orientation of a back reflector having joined reflective and prism layers in a turning film backlight in accordance with embodiments of the invention.

In the embodiment illustrated in FIG. 8, a wedge-type lightguide 860 is used in a turning film application, where the internal light guiding portion of the lightguide has a substantially uniform refractive index. The lightguide 860 includes substantially planar front and back surfaces 861, 862. In some applications, light extraction features may be arranged on the back surface 862 and/or the exit surface 861 of the lightguide 860.

The backlight 800 uses a turning film 850 having prisms 855 having prism peaks oriented toward the exit surface 861 of the lightguide 860. In some configurations, the peaks of the prisms 855 on the turning film 850 are aligned substantially parallel to the input edge of the 863 of the lightguide 860. The back reflector 805 incorporates a reflective layer 810 in direct contact and/or joined to a prism layer 820. The prism peaks 822 of the prism layer 820 are oriented toward the back surface 862 of the lightguide 860. The longitudinal axis of the reflector 805, which runs along the prism peaks 822 of the prism layer 820, is aligned substantially perpendicular to the input edge 863 of the lightguide 860 and/or substantially parallel with the direction of light as the light travels along the lightguide 860 from the input edge 863 toward the end edge 864.

An example of a plot useful for determining the prism angle for the reflector prisms is shown in FIG. 9. The lightguide used for this example was a 232 mm by 304 mm wedge lightguide with a 0.5° wedge angle and 10 μm high ellipsoidal extractors with a transverse extent of 80 μm by 100 μm. The refractive index of the prism material was 1.54. In FIG. 9, the peak luminance of the turning film backlight is plotted versus the internal prism angle of the back reflector prism layer. For this particular lightguide and prism refractive index, the optimal prism angle is 110°.

FIGS. 10A and 10B are conoscopic plots of the emission patterns of backlights. A conoscopic plot is a polar plot showing the radiance or luminance of a light source with respect to light output angle. The azimuthal angle of the plot corresponds directly to the azimuthal angle of the hemisphere into which light is emitted. The radial distance on the conoscopic plot corresponds linearly to the polar angle of the hemisphere into which light is emitted.

In FIGS. 10A and 10B, the top of the plot corresponds to the direction along the lightguide away from the light emitters. FIG. 10A shows the conoscopic plot for a backlight using a back reflector according to embodiments of the invention, while FIG. 10B shows a conoscopic plot for the same backlight but using a conventional back reflector. The light emission angle in the horizontal direction is substantially compressed when the joined reflective layer and prism layer back reflector is used, which provides more light on axis to the viewing angle normal to the surface of the backlight. The enhanced output distribution is especially obvious if the inner contours of the plots are compared.

Figure 11:
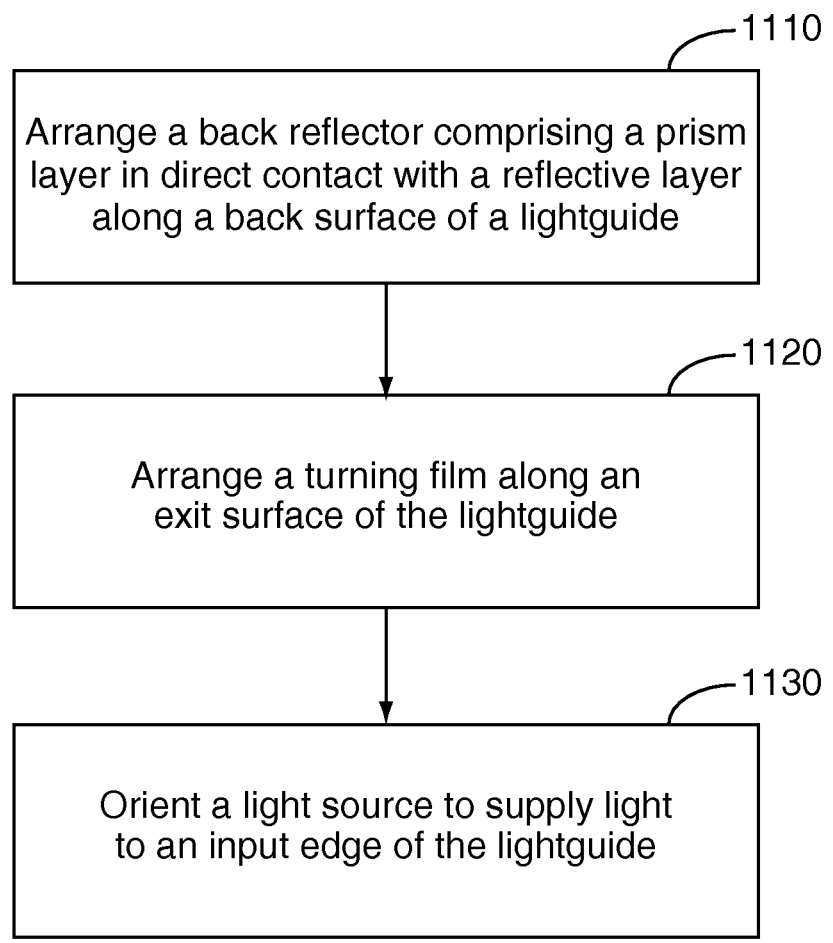
FIG. 11 is a flow diagram illustrating a process for making a turning film backlight in accordance with embodiments of the invention.

FIG. 11 is a flow diagram illustrating a process for making a backlight in accordance with embodiments of the invention. The process involves arranging 1110 a back reflector along a back surface of a lightguide. The light guiding portion of the lightguide has a substantially spatially uniform index of refraction. The back reflector comprises a reflective layer in contact with a prism layer having rows of substantially linear prisms. The back reflector is oriented so that prism peaks of the prism layer point toward the back surface of the lightguide. A turning film is arranged 1120 long an exit surface of the lightguide. A light source is oriented 1130 to supply light into an input edge of the lightguide.

In some embodiments, prior to arranging the back reflector, the prism layer and the reflective layer of the back reflector are joined, such as by adhesion, lamination, or other joining processes. In some embodiments, the prism layer is microreplicated on a multilayer polymeric reflector to form the back reflector prior to arrangement in the backlight. In yet other embodiments, the prism and reflective layers are formed together as a unitary structure, such as by coextrusion.

Systems, devices or methods according to the present invention may include one or more of the features, structures, methods, or combinations thereof described herein. For example, a device or system may be implemented to include one or more of the advantageous features and/or processes described below. It is intended that such a device or system need not include all of the features described herein, but may be implemented to include selected features that provide for useful structures and/or functionality. Methods may include one or more of the described steps and are not limited to any particular order of implementation.

The foregoing description of the various embodiments of the invention has been presented for the purposes of illustration and description. It is not region intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A turning film backlight, comprising:
    a lightguide, a light guiding region of the lightguide having an exit surface, a back surface, and at least one input edge, the light guiding region having a substantially spatially uniform refractive index;
    at least one light source arranged to supply light to the input edge of the lightguide;
    a turning film arranged to direct light emerging from the lightguide exit surface toward an illumination field and comprising a plurality of prisms having prism peaks facing the exit surface of the lightguide;
    a reflector disposed along the back surface of the lightguide, the reflector comprising:
        a reflective layer; and
        a prism layer in contact with the reflective layer and disposed between the reflective layer and the back surface of the lightguide, the prism layer comprising a series of substantially linear prisms having prism peaks facing the back surface of the lightguide.

2. The backlight of claim 1, wherein the reflective layer is joined to the prism layer.

3. The backlight of claim 1, wherein the back surface of the backlight is substantially planar.

4. The backlight of claim 1, wherein the reflector is configured to provide a smaller angular output range of light emerging from the backlight when compared to a backlight having a reflector without the prism layer.

5. The backlight of claim 1, wherein one or both of the reflective layer and the prism layer comprises an adhesive sub-layer, the adhesive sub-layer joining the prism layer and the reflective layer.

6. The backlight of claim 5, wherein the adhesive sub-layer comprises a radiation curable adhesive.

7. The backlight of claim 1, wherein at least some of the prisms vary in height along a longitudinal axis extending parallel to peaks of the linear prisms.

8. The backlight of claim 1, wherein at least some of the prisms vary in pitch along a longitudinal axis extending parallel to peaks of the linear prisms.

9. The backlight of claim 1, wherein a first set of the prisms has a peak height greater than a second set of the prisms.

10. The backlight of claim 1, wherein the prisms comprise triangular prisms having substantially planar sides and an internal angle in a range of about 60° to about 170°.

11. The backlight of claim 1, wherein the prisms have curved sides.

12. The backlight of claim 1, wherein the reflective layer comprises a multilayer polymeric structure.

13. The backlight of claim 12, wherein the multilayer polymeric structure comprises birefringent first polymeric optical layers alternating with second polymeric optical layers.

14. The backlight of claim 1, wherein prism peaks of the reflector are oriented substantially perpendicular to the input edge of the lightguide.

15. The backlight of claim 1, wherein peaks of the prisms of the prism layer are flattened or rounded.

16. The backlight of claim 1, wherein the lightguide further comprises light extractors arranged on the output surface.

17. The backlight of claim 1, wherein the peaks of the prisms of the turning film are substantially parallel to the at least one input edge of the lightguide.

* * * * *